G. CROMPTON.
Clutch Mechanism.
No. 200,375. Patented Feb. 19, 1878.
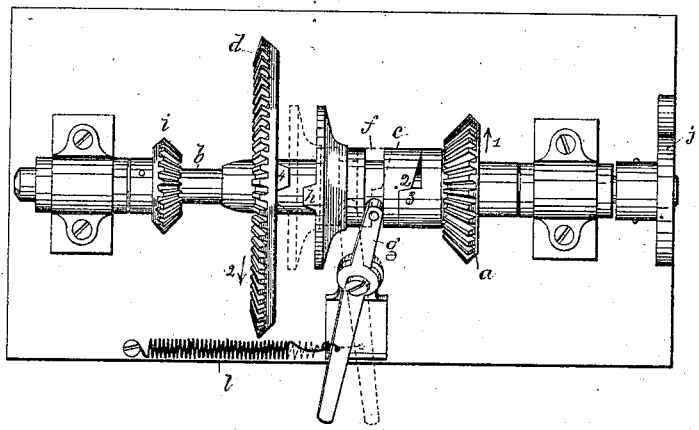
Witnesses.
F. H. Mudge.
W. J. Pratt.
Inventor.
George Crompton
by Crosby & Gregory
Attys

UNITED STATES PATENT OFFICE.

GEORGE CROMPTON, OF WORCESTER, MASSACHUSETTS.

IMPROVEMENT IN CLUTCH MECHANISMS.

Specification forming part of Letters Patent No. 200,375, dated February 19, 1878; application filed February 1, 1878.

*To all whom it may concern:*

Be it known that I, GEORGE CROMPTON, of Worcester, Worcester county, and State of Massachusetts, have invented an Improvement in Clutch Mechanisms, of which the following is a specification:

This invention relates to a clutch device chiefly applicable to looms, but capable of being applied to other mechanism, wherein it is desired at times to rotate a shaft from either one of two rotating shafts revolving in opposite directions.

United States Patent No. 177,323, May 16, 1876, Figs. 28 and 29, show a loom provided with a clutching mechanism to engage with one of two bevel-pinions, and rotate the shaft upon which the clutch is placed.

The devices herein described are intended as an improvement upon the devices described in that patent.

The drawing represents this my improved clutch mechanism applied to a shaft, which it is desired at times, through oppositely-rotating shafts, to rotate in opposite directions.

The bevel-pinions $a$ $d$, loose upon the shaft $b$, are engaged by bevel-pinions on rotating shafts placed at right angles to the shaft $b$, such two shafts, when in operation, rotating in opposite directions, so that one shaft—say, the crank-shaft, (not shown)—of a loom will rotate pinion $a$ in the direction of the arrow 1, and the other shaft, a pick-finding shaft, (not shown,) will, when in operation, rotate the pinion $d$ in the direction of the arrow 2. The clutch between the two pinions is composed of a sleeve having at one end cogs $h$, to engage cogs 4 on pinion $d$, and at its opposite end a shoulder, 2, to engage a shoulder, 3, in the sleeve of the loose pinion $a$. The sleeve of the clutch is grooved at $f$ to receive a pin on a shipper-lever, $g$, operated by hand, or, preferably, by means of a foot-treadle, as described in the patent referred to, to which reference may be had.

The clutch is keyed upon the shaft so as to be moved longitudinally thereon. The end of the clutch-sleeve is inclined, as shown in the drawing, commencing with the shoulder 2, so that, when the rotation of the pinion $a$ is stopped, and the clutch is moved far enough to the left to pass the shoulder 2 beyond the shoulder 3, and place the cogs $h$ in contact with cogs 4 on the pinion $d$, which is then in rotation, the action of the cogs 4 on the cogs $h$ will rotate the clutch-sleeve toward the left, placing the cogs 4 and $h$ in full engagement. This inclined end of the clutch-sleeve therefore aids in the movement of the clutch as it engages the pinion $d$.

It will be noticed that the cogs $h$ and 4 are beveled, so that when the shipping-lever $g$ is left free to be moved by a suitable spring, as at $l$, the cogs will readily disengage, and the sleeve be moved to the right by such spring. If the faces of the cogs were not beveled, the friction between them would be made greater than when beveled, and a very much stronger spring would be required to disengage the cogs, which would also increase the resistance to be overcome when moving the clutch to the left.

I claim—

1. The shaft $b$ and loose pinions $a$ $d$, in combination with a clutch and beveled cogs, $h$ 4, to operate substantially as and for the purpose described.

2. The shaft $b$, the loose pinion $a$ provided with a shoulder, the loose pinion $d$ provided with a cog, 4, in combination with the clutch provided with the cog $h$, and the shoulder and inclined end, to operate all substantially as described.

In testimony whereof I have signed my name to this specification in the presence of two subscribing witnesses.

GEO. CROMPTON.

Witnesses:
J. B. SYME,
J. A. WARE.